United States Patent [19]

Wick

[11] Patent Number: 4,493,180
[45] Date of Patent: Jan. 15, 1985

[54] LAWN MOWER DEAD MAN CONTROL

[75] Inventor: Gerald H. Wick, Galesburg, Ill.

[73] Assignee: Outboard Marine Corporation, Waukegan, Ill.

[21] Appl. No.: 429,060

[22] Filed: Sep. 30, 1982

[51] Int. Cl.³ ............................................. A01D 69/00
[52] U.S. Cl. ........................................ 56/11.3; 56/10.5
[58] Field of Search ........................ 56/11.3, 10.5, 11.8

[56] References Cited

U.S. PATENT DOCUMENTS

| 962,780 | 6/1910 | Nelson | 56/11.8 |
| 969,797 | 9/1910 | Mustin | 56/10.5 |
| 2,947,132 | 8/1960 | Shaw | 56/11.1 |
| 3,543,892 | 12/1970 | DeBaillie | 56/11.3 |
| 3,903,679 | 9/1975 | Sorenson et al. | 56/11.6 |
| 3,998,034 | 12/1976 | Rubin | 56/11.3 |
| 4,037,389 | 7/1977 | Harkness | 56/11.3 |
| 4,044,533 | 8/1977 | Wick | 56/11.3 |
| 4,058,957 | 11/1977 | Roseberry | 56/11.8 |
| 4,158,944 | 6/1979 | Rabinow | 56/11.3 |
| 4,159,614 | 7/1979 | Thomas et al. | 56/11.6 |
| 4,195,466 | 4/1980 | Heismann | 56/10.5 |
| 4,212,141 | 7/1980 | Miyazawa et al. | 56/11.8 |
| 4,213,288 | 7/1980 | Takeuchi, et al. | 56/11.6 |
| 4,218,864 | 8/1980 | Allemeersch et al. | 56/11.2 |
| 4,221,108 | 9/1980 | Owens | 56/10.5 |
| 4,277,936 | 7/1981 | Hoff | 56/11.7 |
| 4,281,732 | 8/1981 | Hoch | 180/19 H |
| 4,290,256 | 9/1981 | Seifert | 56/11.3 |
| 4,307,558 | 12/1981 | Bent | 56/11.6 |
| 4,316,355 | 2/1982 | Hoff | 56/11.3 |
| 4,322,935 | 4/1982 | Poehlman | 56/11.3 |
| 4,326,368 | 4/1982 | Hoff | 56/11.3 |
| 4,327,539 | 5/1982 | Briko et al. | 56/11.3 |
| 4,335,566 | 6/1982 | Hurd | 56/11.3 |
| 4,363,206 | 12/1982 | Schmitt | 56/11.3 |
| 4,430,848 | 2/1984 | Wistrom | 56/11.3 |

FOREIGN PATENT DOCUMENTS 1782786 4/1973 Fed. Rep. of Germany ....... 56/11.3

Primary Examiner—Paul J. Hirsch
Attorney, Agent, or Firm—Michael, Best & Friedrich

[57] ABSTRACT

A lawn mower including a blade housing supporting a prime mover which drives a cutter blade. The prime mover causes rotation of a drive shaft and a clutch driven by the drive shaft is engagable and disengagable with the cutter blade. A handle is connected to the housing and a dead man control is pivotally attached to the handle. The lawn mower further includes an arrangement operable to permit the engagement and disengagement of the clutch means by the pivotal movement of the dead man control. This arrangement includes a flexible member connecting the dead man control and the clutch and an arrangement restricting a substantial portion of the flexible member to a predetermined path along the handle. The restricting arrangement includes a pulley rotatably attached to the handle between the dead man control and the housing and the flexible member is guided around the pulley. In one embodiment, the mower is self-propelled and includes wheels connected to the housing to support travel of the housing over the ground. The mower also includes a mower propelling arrangement engagable with the wheels. An upper handle is movably attached to a guiding handle and a link connects the upper handle to the mower propelling arrangement. The link is movable in response to movement of the upper handle to cause engagement of the mower propelling arrangement. The self-propelled lawn mower has the dead man control movably attached to the upper handle and the pulley has a periphery generally adjacent the attachment of the upper handle to the guiding handle so the upper handle and dead man control can be operated independently.

16 Claims, 5 Drawing Figures

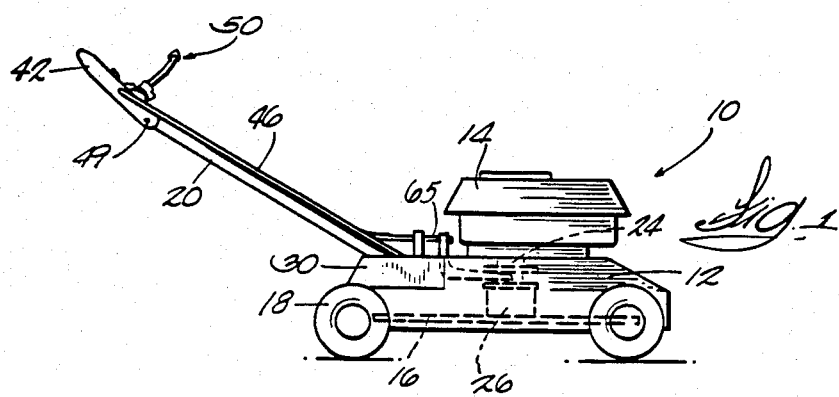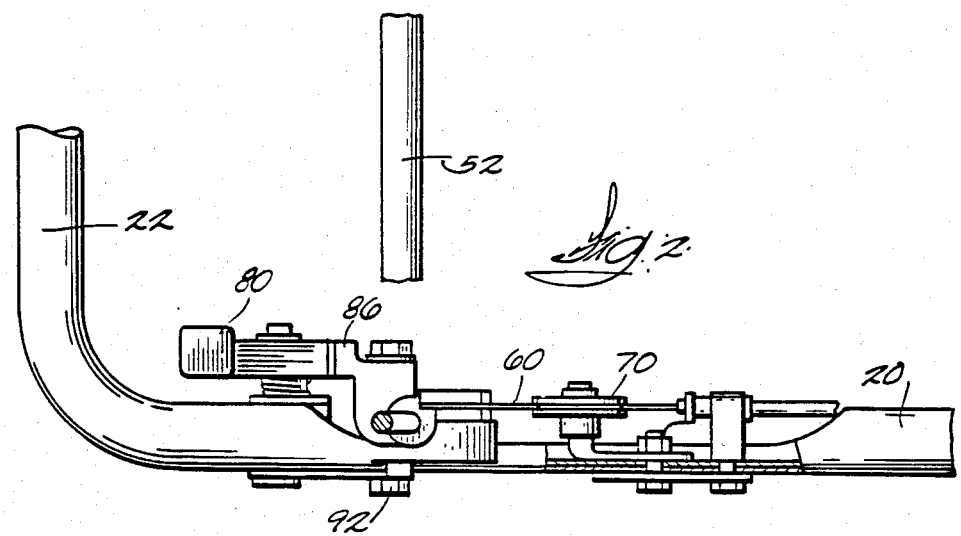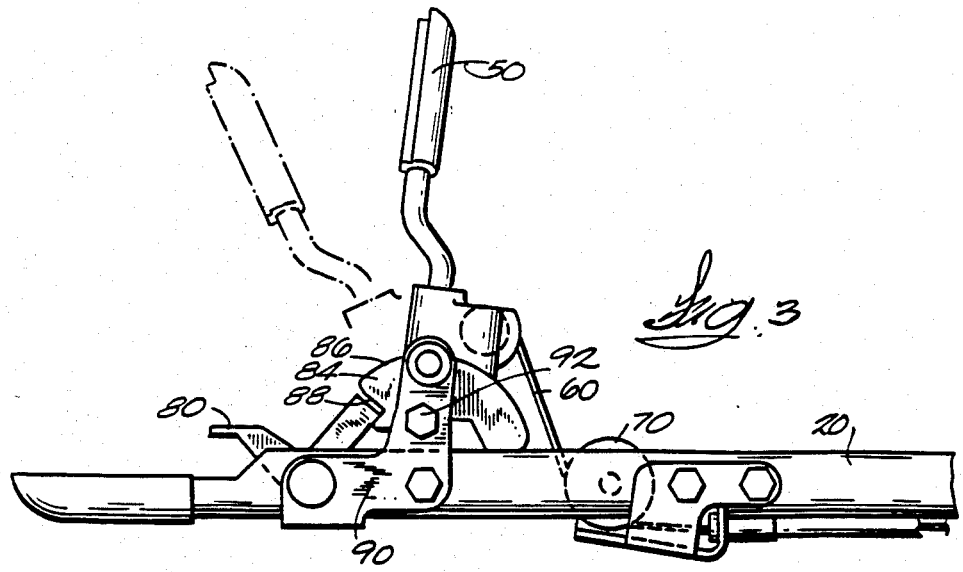

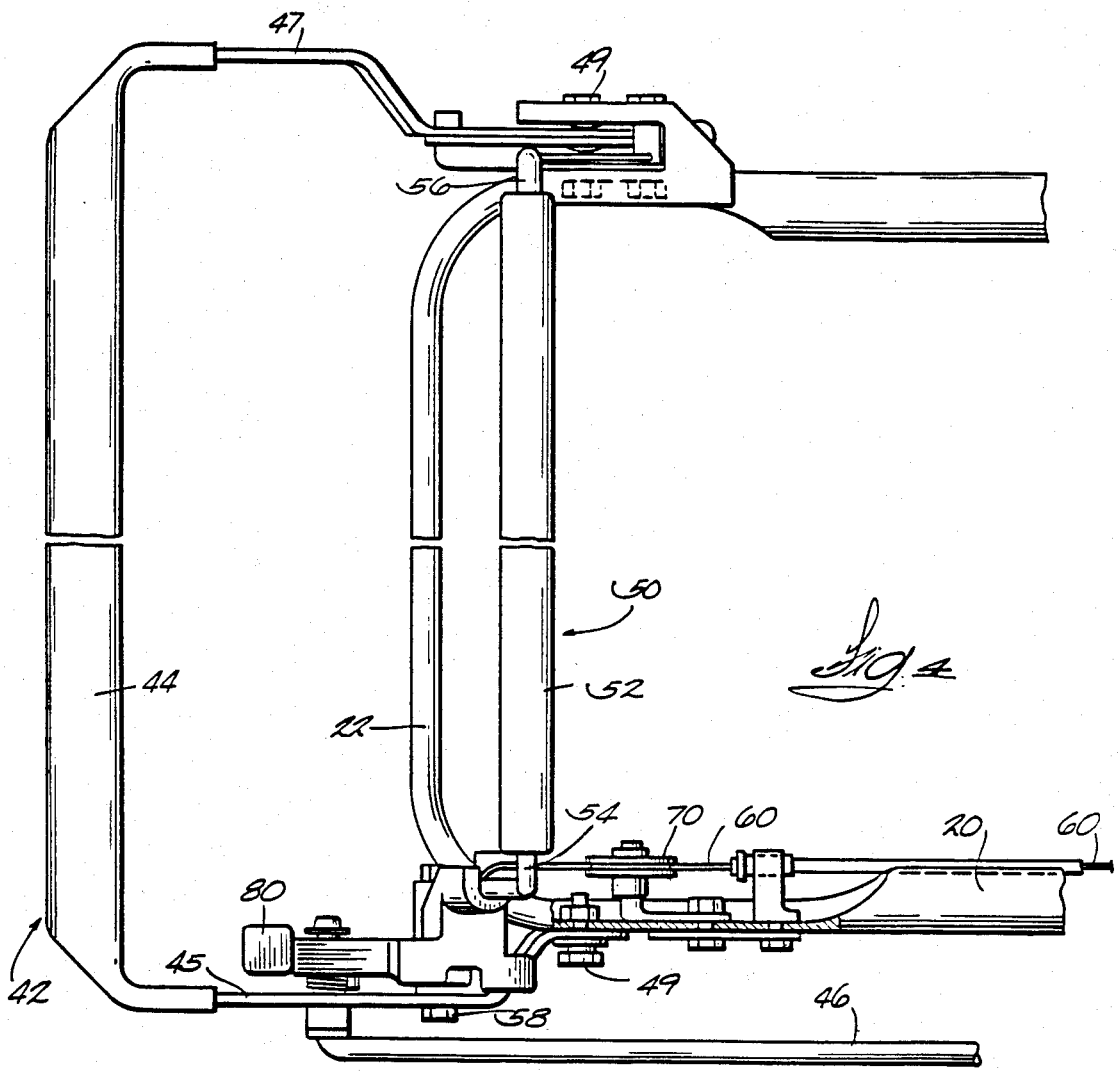
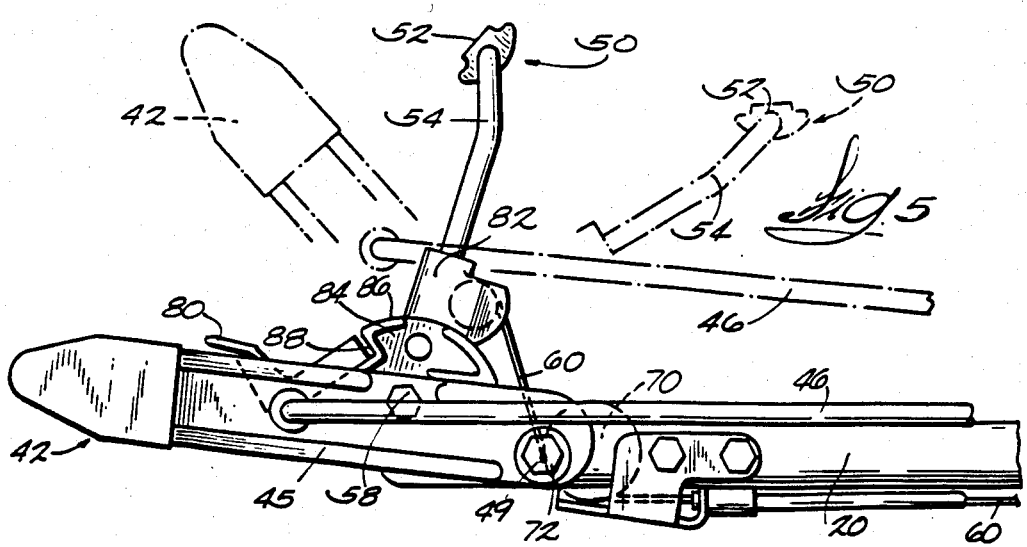

LAWN MOWER DEAD MAN CONTROL

BACKGROUND AND SUMMARY OF THE INVENTION

This invention relates to dead man control arrangements for both push and self-propelled lawn mowers. Attention is directed to Hurd, U.S. Pat. No. 4,335,566 which discloses a single control member for actuating a clutch drive and mower propelling means, unlike the invention disclosed herein.

The invention provides a lawn mower including a blade housing supporting a prime mover which drives a cutter blade. The prime mover causes rotation of a drive shaft and clutch means driven by the drive shaft is engagable and disengagable with the cutter blade. A handle is connected to the housing and the control means is movably attached to the handle.

The lawn mower further includes means operable to permit the engagement and disengagement of the clutch means by the movement of the control means. This means includes a flexible member connecting the control means and the clutch means and means restricting a substantial portion of the flexible member to a predetermined path along the handle. In one embodiment, the restricting means includes a pulley rotatably attached to the handle between the control means and the housing and the flexible member is guided around the pulley.

In one embodiment, the lawn mower includes biasing means biasing the control means toward a disengaged clutch position and in another embodiment the biasing means and clutch means comprises a self-biasing clutch.

In one embodiment, the mower is self-propelled and includes travel means connected to the housing and supporting travel of the housing over the ground. The mower also includes mower propelling means engagable with the travel means. An upper handle is movably attached to a guiding handle and linkage means connects the upper handle to the mower propelling means. The linkage means is movable in response to movement of the upper handle to cause engagement of the mower propelling means. The self-propelled lawn mower has the control means movably attached to the upper handle and the pulley has a periphery generally adjacent the attachment of the upper handle to the guiding handle so the upper handle and control means can be operated independently.

In one embodiment, the lawn mower includes a lock lever means for preventing the inadvertent movement of the control means. The lock lever means comprises a V-shaped lever pivotally attached to the guiding handle adjacent a plate with a rounded edge attached to the control means adjacent the attachment of the control means to the guiding handle. The plate's rounded edge includes a notch and the V-shaped lever is pivotable between a position where the lever is received in the notch and prevents the pivotal movement of the control means and a position where the lever is out of the notch and permits the pivotal movement of the control means.

Various of the features and advantages of various embodiments of the invention will become apparent upon reviewing the following drawings, the detailed description and the appended claims.

BRIEF DESCRIPTION OF THE DRAWINGS

FIG. 1 is a side view of a self-propelled lawn mower including various of the features of the invention.

FIG. 2 is a top view partially in section of the upper portion of a guiding handle for a push only lawn mower.

FIG. 3 is a side view of the upper portion of the guiding handle shown in FIG. 2.

FIG. 4 is a top view partially in section of the upper portion of a guiding handle portion of the self-propelled lawn mower shown in FIG. 1.

FIG. 5 is a side view of the upper portion of the guiding handle shown in FIG. 4.

Before explaining at least one embodiment of the invention in detail, it is to be understood that the invention is not limited in its application to the details of construction and the arrangement of components set forth in the following description or illustrated in the drawings. The invention is capable of other embodiments and of being practiced or carried out in various ways. Also, it is to be understood that the phraseology and terminology employed herein is for the purposes of description and should not be regarded as limiting.

DESCRIPTION OF THE PREFERRED EMBODIMENT

Shown in the drawings is a lawn mower 10 including a blade housing 12 supporting a prime mover 14 which drives a cutter blade 16. The blade housing 12 is suitably supported for travel over the ground by a plurality of wheels 18 and is guided for travel over the ground by a guiding handle 20. The guiding handle 20 is generaly U-shaped and includes a cross bar 22 at the upper or operator end.

More particularly, the prime mover 14 is an internal combustion engine which rotatably drives an output or drive shaft or an alternative drive member 24 including a lower end portion adapted to support and drive the rotary cutter blade 16.

Further included is clutch and brake means 26 for providing a selective driving engagement between the drive shaft 24 and the cutter blade 16 such that the cutter blade 16 can be selectively driven by the drive shaft 24 and such that the driving engagement between the cutter blade 16 and the drive shaft 24 can be disengaged.

The lawn mower 10 further includes means providing for wheel adjustment and driving of the wheels to allow for self-propulsion of the lawn mower. To this end the lawn mower includes means 30 (shown symbolically in FIG. 1) for engaging the wheels of the lawn mower. Any suitable means 30 for causing the engagement of the wheels can be used, an example of which is more particularly described in Shaw U.S. Pat. No. 2,947,132, issued Aug. 2, 1960, which is incorporated herein by reference.

The lawn mower 10 further includes means for controlling the self-propulsion of the lawn mower. The control means comprises a control or upper handle 42 capable of limited independent movement relative to the guide handle 20 on the lawn mower 10. The upper handle 42 is generally U-shaped in construction, as shown in FIG. 4, and includes a cross bar 44 connecting two arms 45 and 47, and is rotatably attached to the upper or operator end 22 of the guiding handle 20 by suitable means 49.

The control means also includes linkage means movable in response to pivotal movement of the upper handle 42 to cause the engagement of the mower propelling means 30. The linkage means includes a rigid member or link 46 connected to the arm 45 of the upper handle 42 at a position above the point of pivotal attachment 49 of the arm 45 to the guiding handle 20. The link 46 is also operably connected to the means 30 for causing frictional engagement of the rear wheels. Forward movement of the upper handle 42 toward the blade housing 12 (as shown in FIG. 5) moves the link 46 forward and causes engagement of the wheel engaging means 30. Rearward movement of the upper handle 42 accordingly causes disengagement of the wheel engaging means 30.

The lawn mower further includes clutch operating means operable to permit the engagement and disengagement of the clutch and brake means. The clutch operating means includes control means or dead man control bail 50 capable of limited independent movement relative to the upper handle 42. The control bail 50 is generally U-shaped and configured so that a cross bar 52 connecting two arms 54 and 56 of the bail 50 is disposed adjacent the cross bar 44 of the upper handle when in a clutch and brake means engaging position so the control bail 50 and upper handle 42 can be grasped by an operator simultaneously. The control bail 50 is connected to the upper handle 42 by suitable means 58 providing for pivotal movement of the control bail 50 relative to the upper handle 42.

The clutch operating means further includes means operable to permit the engaging and disengaging of the clutch and brake means 26 by the pivotal movement of the control bail 50.

More particularly, the means includes a flexible member or bowden wire 60 connected to the control bail 50 adjacent but above the pivotal attachment of the control bail 50 to the upper handle 42. The flexible member 60 is also operably connected to the clutch and brake means 26 to engage the clutch 26 and cutter blade 16 when the flexible member 60 moves rearwardly away from the housing 12 and to disengage the clutch 26 and cutter blade 16 and brake the cutter blade 16 when the flexible member 60 moves forwardly toward the housing 12.

Biasing means are also provided for baising the flexible member 60 and control bail 50 in the clutch disengaging direction. In this embodiment, the biasing means comprises a spring 65, as shown in FIG. 1. A more detailed description of the spring 70 and one clutch and brake means 26 are described in Poehlman, U.S. Pat. No. 4,322,935, issued Apr. 6, 1982, which is incorporated herein by reference. In another embodiment, a combination biasing means and clutch and braking means 26 can be used, such as the self-biasing clutch and brake means described in Bent et al U.S. Pat. No. 4,307,558, issued Dec. 29, 1981, which is incorporated herein by reference.

Means are further provided for restricting a substantial portion of the flexible member 60 to a predetermined path extending along the guiding handle. More particularly, the restricting means includes a pulley 70 rotatably attached to the center of the inside of the guiding handle 20 near the control bail 50 along the path of the flexible member 60 between the control bail 50 and the clutch and brake means 26. The rotational path of the pulley 70 and the pivotal path of movement of the control bail 50 are generally vertical and parallel so as to limit the sideways movement of the flexible member 60 between the pulley 70 and the control bail 50.

Means are further provided for permitting the control bail 50 to pivot independently from the upper handle 42, and the upper handle 42 to rotate independently from the control bail 50. More particularly, the means comprises rotatably attaching a guide means or the pulley 70 to the inside of the guiding handle 20 so a periphery 72 of the pulley 70 which contacts the flexible member 60 is generally adjacent the pivotal attachment of the upper handle 42 to the guiding handle 20. As a result of the location of the pulley 70, when the upper handle 42 is pivoted the flexible member 60 rotates about a point generally fixed by the periphery 72 of the pulley and corresponding to where the upper handle 42 pivots on the guiding handle 20. Since the flexible member 60 only rotates and does not move either toward or away from the clutch and brake means 26, the upper handle 42 can be rotated and the mower propelling means 30 operated independently from the clutch operating means. Since the distance of the attachment of the flexible member 60 to the control bail 50 relative to the pulley 70 and upper handle 42 remains the same even though the upper handle 42 has moved relative to the guiding handle 20, the control bail 50 can be pivoted and the clutch engaging and disengaging means can be operated independently from the mower propelling means 30.

Means are further provided for locking the dead man control or bail 50 so as to prevent inadvertent movement of the control bail 50. More particularly, the means includes a generally V-shaped lever 80 pivotally connected to the center of the inside of the upper handle 42 and adjacent the end 82 of the control bail 50 and including, as shown in the drawings, an apex portion. The end 82 of the control bail 50 includes a plate 84 having a rounded edge 86 with a notch 88 engagable with the V-shaped lever 80. As best shown in FIG. 5, when the V-shaped lever 80 is pivoted in a counterclockwise manner away from the control bail 54, the lever 80 is moved away from the end 82 of the control bail 50 and out of the notch 88 and the control bail 50 is free to move towards the operator to engage the clutch means 26 and cutter blade 16. Likewise, when the control bail 50 is in a clutch disengaging position away from the operator, the V-shaped lever 80 can be pivoted toward the control bail 50 and received in the notch 88 to prevent inadvertent movement of the control bail 50 into a clutch and cutter blade engaging position.

FIGS. 2 and 3 illustrate another embodiment of the clutch operating means in combination with a push only lawn mower. A push only lawn mower does not include an upper handle 42, so the clutch operating means is attached, as previously described, to the guiding handles 20 instead of the upper handle 42, with one exception. The means providing for pivotal movement of the control bail 50 relative to the guiding handle 20 includes brackets 90 mounted on the guiding handle 20, and the control bail 50 is pivotally attached to the brackets 90 by suitable means 92 located above the guiding handle 20. The embodiment illustrated in FIGS. 2 and 3 could also be used on a self-propelled lawn mower which uses self-propelling control means not including a movable upper handle.

Various of the features of the invention are set forth in the following claims.

I claim:

1. A lawn mower comprising a housing, a prime mover supported by said housing, a drive shaft driven by said prime mover, a cutter blade, clutch means driven by said drive shaft and engagable and disengagable with said cutter blade, a handle connected to said housing, control means movably attached to said handle about spaced first and second pivot axes, and linkage means for engaging and disengaging said clutch means in response to movement of said control means relative to said second pivot axis, said linkage means including a pulley rotatably attached to said handle and with said pulley having a periphery adjacent to said first pivot axis, and a longitudinally displaceable flexible member guided around said pulley and connecting said control means to said clutch means, whereby movement of said control means about said first pivot axis is ineffective to longitudinally displace said flexible member.

2. A lawn mower in accordance with claim 1 and further including biasing means biasing said control means towards a disengaged clutch position.

3. A lawn mower in accordance with claim 2 wherein said biasing means comprises a spring.

4. A lawn mower in accordance with claim 2 wherein said biasing means and said clutch means comprises a self-biasing clutch.

5. A lawn mower in accordance with claim 1 wherein said control means comprises a bail with two arms connected by a cross bar and pivotally attached to said handle, and wherein one of said arms is pivotable in a generally vertical plane and said flexible member is connected to said arm, and wherein said pulley is rotatable in a generally vertical plane.

6. A self-propelled lawn mower comprising a housing, a prime mover supported by said housing, a drive shaft driven by said prime mover, a cutter blade, clutch means driven by said drive shaft and engagable and disengagable with said cutter blade, a guiding handle connected to said housing, wheel means connected to said housing for supporting travel of said housing over the ground, means driven by said prime mover and engagable with said wheel means for propelling said housing along the ground, an upper handle movably attached to said guiding handle, first linkage means connecting said upper handle to said housing propelling means and movable in response to movement of said upper handle to cause movement of said housing, control means movably attached to said upper handle, and second linkage means connecting said control means and said clutch means, said second linkage means including operating means for engaging and disengaging said clutch means in response to movement of said control means and for permitting independent operation of said control means and said upper handle, said operating means comprising guide means attached to said guiding handle between said control means and said housing and adjacent the attachment of said upper handle to said guiding handle, and a flexible member guided around said guide means and connecting said control means to said clutch means.

7. A self-propelled lawn mower in accordance with claim 6 wherein said guide means comprises a pulley rotatably attached to said guiding handle, and wherein said pulley has a periphery adjacent the attachment of said upper handle to said guiding handle, and wherein said flexible member is guided around said periphery of said pulley.

8. A self-propelled lawn mower in accordance with claim 10 and further including biasing means biasing said control means towards a disengaged clutch position.

9. A self-propelled lawn mower in accordance with claim 7 wherein said control means comprises a bail including two arms connected by a cross bar and pivotally attached to said guiding handle, and wherein one of said arms is pivotable in a generally vertical plane and said flexible member is connected to said arm, and wherein said pulley is rotatable in a generally vertical plane.

10. A self-propelled lawn mower in accordance with claim 8 wherein said biasing means comprises a spring.

11. A self-propelled lawn mower in accordance with claim 8 wherein said biasing means and said clutch means comprises a self-biasing clutch.

12. A lawn mower comprising a housing, a prime mover supported by said housing, a drive shaft driven by said prime mover, a cutter blade, clutch means driven by said drive shaft and engable and disengagable with said cutter blade, a handle connected to said housing, control means adapted to be grasped by the user and attached to said handle and operable to permit the engagement and disengagement of said clutch means by the movement of said control means, said control means including a notch near the attachment of said control means to said handle, and lock lever means for preventing inadvertent movement of said control means and comprising a V-shaped lever including an apex portion pivotally attached to said handle adjacent said notch for pivotal movement between a position where said lever is received in said notch and prevents the movement of said control means, and a position where said lever is out of said notch and permits the pivotal movement of said control means.

13. A lawn mower in accordance with claim 12 wherein said control means further includes a plate with a rounded edge and attached to said control means near said point of attachment, and wherein said notch is in said rounded edge of said plate.

14. A lawn mower in accordance with claim 12 and further including travel means connected to said housing and supporting travel of said housing over the ground, mower propelling means engagable with said travel means, an upper handle movably attached to said handle, and linkage means connecting said upper handle to said mower propelling means and movable in response to movement of said upper handle to cause engagement of said mower propelling means, and wherein said V-shaped lever and said control means are mounted on said upper handle.

15. A lawn mower comprising a housing, a plurality of wheels supporting said housing for travel over the ground, a prime mover supported by said housing, a cutter blade, clutch means for selectively driving said cutter blade by said prime mover, a handle connected to said housing, a control handle movably mounted on said handle, linkage means connected to said control handle, to said prime mover, and to one of said wheels for selectively propelling said housing along the ground in response to movement of said control handle, a control element movably mounted on the control handle, additional linkage means connecting said control element to said clutch means for operational control of said clutch means in response to control element movement, said control element including a notch near the mounting of said control element on said control handle, and lock lever means for preventing inadvertent movement of said control element and comprising a V-shaped lever pivotally mounted on said control handle adjacent said notch and pivotal between a position wherein said lever is received in said notch so as to prevent pivotal movement of said control element, and a position wherein said lever is out of said notch so as to permit pivotal movement of said control element.

16. A lawn mower comprising a housing, a plurality of wheels supporting said housing for travel over the ground, a prime mover supported by said housing, a cutter blade, clutch means connected to said cutter blade, a handle connected to said housing, a control handle movably mounted on said handle, linkage means connected to said control handle, to said prime mover, and to one of said wheels for selectively propelling said housing along the ground in response to movement of said control handle, a control element movably mounted on the control handle, and additional linkage means connected to said control element, to said prime mover, and to said clutch means for selectively engaging said clutch means in response to control element movement to rotate said cutter blade.

* * * * *